US011926910B2

(12) United States Patent
Soerensen

(10) Patent No.: US 11,926,910 B2
(45) Date of Patent: Mar. 12, 2024

(54) OFFSHORE WIND TURBINE WITH A FLUID SUPPLY ASSEMBLY COMPRISING A CLEANING UNIT

(71) Applicant: Siemens Gamesa Renewable Energy A/S, Brande (DK)

(72) Inventor: Johnny Soerensen, Videbaek (DK)

(73) Assignee: SIEMENS GAMESA RENEWABLE ENERGY A/S, Brande (DK)

(*) Notice: Subject to any disclaimer, the term of this patent is extended or adjusted under 35 U.S.C. 154(b) by 79 days.

(21) Appl. No.: 17/846,189

(22) Filed: Jun. 22, 2022

(65) Prior Publication Data

US 2023/0028770 A1    Jan. 26, 2023

(30) Foreign Application Priority Data

Jul. 19, 2021   (EP) .................................... 21186340

(51) Int. Cl.
| | | |
|---|---|---|
| *C25B 15/08* | (2006.01) | |
| *C25B 1/04* | (2021.01) | |
| *F03D 9/19* | (2016.01) | |

(52) U.S. Cl.
CPC .............. *C25B 15/085* (2021.01); *C25B 1/04* (2013.01); *F03D 9/19* (2016.05); *F05B 2220/61* (2013.01)

(58) Field of Classification Search
CPC . C25B 15/085; C25B 1/04; F03D 9/19; F05B 2220/61
See application file for complete search history.

(56) References Cited

U.S. PATENT DOCUMENTS

| | | | |
|---|---|---|---|
| 5,592,028 A | 1/1997 | Pritchard | |
| 5,592,029 A | 1/1997 | Hollstein et al. | |
| 2009/0313896 A1* | 12/2009 | Glidewell | ................. C25B 1/04 48/190 |

FOREIGN PATENT DOCUMENTS

| | | |
|---|---|---|
| CN | 109047201 A | 12/2018 |
| DE | 102017001257 A1 | 8/2018 |
| GB | 1535255 A | 12/1978 |
| KR | 101419015 B1 | 7/2014 |
| WO | 2009116707 A1 | 9/2009 |
| WO | 2013149287 A1 | 10/2013 |
| WO | 2020095012 A1 | 5/2020 |

OTHER PUBLICATIONS

European Search Report dated Jan. 21, 2022 in priority European Application No. EP21186340.2.

* cited by examiner

*Primary Examiner* — Viet P Nguyen
(74) *Attorney, Agent, or Firm* — Schmeiser, Olsen & Watts LLP

(57) ABSTRACT

An offshore wind turbine erected in a body of water includes a generator, a foundation, a nacelle, a tower having a first end mounted to the foundation and a second end supporting the nacelle, an electrolytic unit arranged above a water level and electrically powered by the generator to produce hydrogen from an input fluid, in particular water, and a fluid supply assembly for supplying the input fluid from a fluid inlet arranged below the water level to the electrolytic unit by means of a fluid connection, wherein the fluid supply assembly includes a cleaning unit configured to clean a build-up formed along an area extending through the inner part of at least a part of the fluid connection or formed at the fluid inlet.

14 Claims, 5 Drawing Sheets

OFFSHORE WIND TURBINE WITH A FLUID SUPPLY ASSEMBLY COMPRISING A CLEANING UNIT

CROSS-REFERENCE TO RELATED APPLICATIONS

This application claims priority to EP Application No. 21186340.2, having a filing date of Jul. 19, 2021, the entire contents of which are hereby incorporated by reference.

FIELD OF TECHNOLOGY

The following relates to an offshore wind turbine with a fluid supply assembly. The following further relates to a method of supplying input fluid to an offshore wind turbine.

BACKGROUND

Wind turbines are increasingly used for the generation of electrical energy. A wind turbine typically comprises a tower and a nacelle mounted on the tower, to which a hub is attached. A rotor is mounted at the hub and coupled to a generator. A plurality of blades extends from the rotor. The blades are oriented in such a way that wind passing over the blades turns the rotor, thereby driving the generator. Hence, the rotational energy of the blades is transferred to the generator, which then converts the mechanical energy into electricity and transfers the electricity to the electrical grid.

Wind turbines are placed at locations providing high wind amounts. These locations can be remote onshore locations or offshore locations on the sea. For the transportation of the electrical energy, the power generated by the generator of the wind turbine travels to a transmission substation of the wind farm, where it is converted to high voltage, usually between 130-765 kV, for long distance transmission on the transmission grid over power lines. The transmission grid connects the remote location of the wind farm to a transformer station of the electrical grid, which transforms the electricity to a voltage compatible with the electrical grid.

A problem of remote wind farms is that the distance between the wind farm and the transformer station of the electrical grid needs to be bridged. Long power lines with very high installation costs are required.

The current development of the technology of wind turbines tends to an increased size of wind turbines for harvesting more wind energy, with longer blades and higher towers. Due to the increasing size of wind turbines, more power is supplied to the grid which is to be transported from the wind farm to the nearest input point of the grid. Increasing the power transferred over the long-distance power lines results in higher requirements for the cables and higher costs.

To reduce the amount of energy transferred by the power lines of the transmission grid or to avoid the use of long-distance power lines completely, an electrolytic unit can be installed in the vicinity of the wind turbine. A wind turbine comprising an electrolytic unit generates electrical power by means of the generator and hydrogen by means of the electrolytic unit driven by at least a part of the power of the wind turbine.

Electrolytic units are power-to-gas units configured to produce hydrogen. Hence, the energy produced by the wind turbine may be used in an electrolysis process to generate hydrogen and oxygen. These gases can be used afterwards for the generation of electrical energy in fuel cells or to produce chemicals, such as ammonia or methane. The produced gases from the electrolytic unit can be transported by using a pipeline or by pressurizing the gas into a container, which is less expensive than transporting electricity directly over long-distance power lines.

The use of electrolytic units in combination with wind turbines is known from the prior art, for example in the document U.S. Pat. No. 5,592,028 A, where a plurality of electrolysis cells are connected to a wind farm and produce hydrogen by means of the electricity produced by the generators of the wind turbines. Similarly, the document WO 2020/095012 A1 describes an offshore wind turbine system for the large-scale production of hydrogen, which includes a floating tower structure with a desalination unit and an electrolysis unit.

In a wind farm with an electrolytic unit, hydrogen is produced with an input fluid. For example, for offshore wind farms, the input fluid is seawater, which is desalinated before entering the electrolytic device. Alternatively, the offshore wind farm might be located on a lake or any water body and the input fluid is water, which is usually filtered prior to entering the electrolytic device. A problem offshore wind turbines face is that the input fluid has to be supplied to the platform where the electrolytic unit is arranged, where the height difference between the water level and the platform has to be overcome. This is achieved by means of a fluid supply assembly.

A problem arising from fluid supply assemblies installed at offshore locations for offshore wind turbines is that the input fluid is not clean. Hence, in the filter, the fluid inlet and the fluid connection of the fluid supply assembly, build-up such as salt, grease, dirt, marine growth and other substances forms over time. This build-up obstructs the passage of the input fluid through the fluid connection, resulting in a pressure drop which has to be compensated by the pump of the fluid supply assembly to be able to supply the electrolytic unit with enough input fluid for the electrolysis process. This problem reduces the efficiency of the system and increases the maintenance efforts and the energy needed by the fluid supply assembly. Moreover, the build-up may damage the components of the electrolytic unit if not properly filtered from the input fluid, resulting in costly damages in the system. Hence, the build-up slows down the fluid supply flow to the electrolytic unit and increases the costs of such process.

SUMMARY

An aspect relates to provide an offshore wind turbine with a fluid supply assembly that overcomes the problems known from the prior art.

According to embodiments of the invention, an offshore wind turbine erected in a body of water comprises a generator, a foundation, a nacelle, a tower having a first end mounted to the foundation and a second end supporting the nacelle, an electrolytic unit arranged above a water level and electrically powered by the generator to produce hydrogen from an input fluid, in particular water, and a fluid supply assembly for supplying the input fluid from a fluid inlet arranged below the water level to the electrolytic unit by means of a fluid connection. The fluid supply assembly comprises a cleaning unit configured to clean a build-up formed along an area extending through the inner part of at least a part of the fluid connection or formed at the fluid inlet, wherein the cleaning unit comprises a nozzle.

The generator generates electric power and supplies the electrolytic unit with at least a part of the power generated, as both components are electrically coupled.

Due to the fluctuation of the power generation, depending for example on weather conditions and wind levels, it is difficult to foresee the power output of an offshore wind turbine to the electricity grid or to an energy storage device. By using a part of the energy produced by the generator to produce hydrogen, the fluctuations can be mitigated. The hydrogen can be taken out of the wind turbine by a system outlet coupled to the output of the electrolytic unit.

Hence, at least a part of the energy produced by the generator can be used to power an electrolytic unit, so that the electricity grid is not overloaded by peaks of power generation of the fluctuating power generation facility. Additionally, if a problem in the output to the electricity grid occurs, the power can be redirected completely to the electrolytic unit so that only hydrogen, is produced. The hydrogen produced is usually in a gaseous state, which can be compressed and/or mixed with other components to a liquid state which is easier to store and/or transport.

The electrolytic unit can also be a mixed gas generator which performs electrolysis and generates other gases. For example, the electrolytic unit can perform electrolysis on water and carbon dioxide to generate a mixed gas made of hydrogen and carbon monoxide. Alternatively, hydrogen can be mixed with natural gas, which increases the hydrogen/carbon ratio of the hydrogen and gives it a flame speed up to eight times higher than compressed natural gas.

The electrolytic unit is used to produce hydrogen from water. Hence, as the wind turbine is installed in the vicinity of water, i.e. a river, a lake or at the sea, the electrolytic unit can use this water as an input to the electrolytic unit to produce hydrogen and oxygen. It is also possible to further process the hydrogen and get other compounds, such as methane or ammonia.

The water is extracted by means of the fluid supply assembly. Hence, the fluid supply assembly supplies the input fluid from a fluid inlet configured to be arranged below a water level to the electrolytic unit arranged above the water level, for example by means of a pump configured to pump the input fluid from the body of water and through the fluid connection between the fluid inlet and the electrolytic unit.

Build-up such as salt, grease, debris, dirt, marine growth such as algae and other substances forms over time in the fluid connection of the fluid supply assembly, as well as in other parts of the fluid supply assembly like the filter or the fluid inlet. This is caused as the input fluid of the offshore wind turbine is usually water coming from the water body where the offshore wind turbine is erected, such as a lake, a river or the sea. Hence, salt, grease, dirt, marine growth and other substances mixed in the water accumulate in the fluid supply assembly, which obstructs the passage of the input fluid through the fluid connection. The obstruction of the fluid connection results in a pressure drop which has to be compensated by the pump of the fluid supply assembly to keep a steady input fluid flow rate for supplying the electrolytic unit with enough input fluid for the electrolysis process.

The use of a cleaning unit is advantageous as it cleans the build-up formed in the fluid connection of the fluid supply assembly, as well as in other parts of the fluid supply assembly like the filter or the fluid inlet. The cleaning process is achieved by spraying a cleaning fluid through a nozzle of the cleaning unit. Hence, the nozzle cleans build-up formed at an area of the fluid connection or build-up formed at the fluid inlet by spraying cleaning fluid at a high pressure on the area.

The nozzle can be of the type of a fluid jet intended to eject fluid in a coherent stream. The nozzle can be of the type of a spray where the fluid is atomized into droplets, wherein the droplets are dispersed in a specific pattern. The eject pressure can be adjusted depending on the cleaning needs.

According to a preferred embodiment of the invention, the cleaning unit comprises a plurality of nozzles. A plurality of nozzles can cover an extended area to be cleaned by the cleaning unit, which decreases the cleaning time and improves the cleaning process.

According to a preferred embodiment of the invention, the offshore wind turbine further comprises a platform supporting at least a part of the electrolytic unit above the water level.

With the dedicated platform, the electrolytic unit can be more easily mounted than for example by installing the electrolytic unit on the nacelle and at least a part of the electrolytic unit can be kept above the water level.

According to another preferred embodiment of the invention, a cleaning fluid is sprayed through the nozzle. The pressure of the cleaning fluid ejected from the nozzle dissolves the build-up formed in the fluid supply assembly.

According to another preferred embodiment of the invention, a cleaning fluid used by the cleaning unit for cleaning the build-up comprises desalinated water from a desalination unit of the electrolytic unit.

The electrolytic unit comprises a desalination unit and an electrolytic device, as well as a fluid connection between the desalination unit and the electrolytic device through which desalinated water is transported. The electrolytic device and the desalination unit are both powered by the generator, which is connected to both devices by means of an electric connection.

The desalination unit can also be coupled to the cleaning unit to deliver desalinated water as the cleaning fluid to the cleaning unit. As the desalinated water is already filtered and clean from any unwanted substances such as grease, salt and dirt, it can be used as the cleaning fluid and be ejected through the nozzles of the cleaning unit. This is particularly advantageous, as the desalinated water does not contain unwanted substances which could block the orifices of the nozzles and obstruct the cleaning unit. Additionally, the cleaning will be more effective by using filtered desalinated water. The desalinated water used for the cleaning process can be disposed in the body of water, as it is not hazardous for the environment. Hence, it does not have to be stored in a waste container for recycling.

The desalinated water can be stored in a desalinated water storage tank and be used for providing cleaning fluid to the cleaning unit and/or for providing input fluid to the electrolytic device.

According to another preferred embodiment of the invention, the cleaning fluid comprises the same fluid used as the input fluid. This is particularly advantageous, as the input fluid is water taken from the body of water where the offshore wind turbine is erected on, therefore the input fluid is available on-site and does not have to be transported to the offshore wind turbine location. Additionally, the cleaning fluid can be disposed in the body of water and does not have to be stored in a waste container for recycling, as the input fluid was taken from the body of water.

According to another preferred embodiment of the invention, the cleaning fluid comprises a treatment fluid. The treatment fluid can be a naturally occurring fluid or a fluid which is non-hazardous, non-toxic, non-pathogenic, non-corrosive, and non-caustic as well as environmentally friendly, thereby allowing to dispose the cleaning fluid directly to the water body the offshore wind turbine is erected on. This is advantageous to dissolve grease or other build-up which cannot be dissolved if the cleaning fluid only consists of the input fluid, i.e. if the cleaning fluid is only water. Additionally, for locations where the water is dirty, it might be advantageous to use a cleaning fluid different from the input fluid for a more efficient cleaning.

According to another preferred embodiment of the invention, at least a part of the cleaning unit is arranged at the inner wall of the fluid connection. For example, a nozzle or a plurality of nozzles can be arranged or distributed at the inner wall of the fluid connection, which can be a hose, a pipeline, a channel and other connections for transporting the input fluid from the fluid inlet to the electrolytic unit. Appropriate cleaning fluid connections to the nozzles can be arranged so that the nozzles can spray the cleaning fluid inside the fluid connection.

According to another preferred embodiment of the invention, the fluid supply assembly further comprises a pump for pumping the input fluid to the electrolytic unit, wherein at least a part of the cleaning unit is arranged at the housing of the pump.

Nozzles can be arranged additionally or alternatively at the pump to spray cleaning fluid from the pump to the inner walls of the fluid connection.

The pump can be a submergible pump configured to be submerged in the water inside the fluid connection. Alternatively, the pump can be a suction pump placed close to the body of water, i.e. at the foundation. The pump can comprise a suction hose to suck the water out of the body of water.

According to another preferred embodiment of the invention, the pump is configured to be lifted and lowered through the fluid connection. This is advantageous, as the pump can be lifted for inspection and for maintenance works, for example to the platform of the wind turbine where it is easier to access the pump. Additionally, the pump can also be raised to be above the water level to protect the pump against corrosion and the marine environment when it is not being used. This also limits the marine growth on the pump and on the hose.

The pump can be raised also due to harsh weather conditions, i.e. due to a storm or the like to protect the pump.

By having a cleaning unit such as a nozzle or a plurality of nozzles arranged at a pump which can be lifted and lowered through the fluid connection, the area cleaned by the cleaning unit is increased, as the pump can be lowered from the upper part of the fluid connection down to the lowest part of the fluid connection and clean the fluid connection through the path where it passes. The cleaning unit is also protected against corrosion and the marine environment when it is not being used if the pump to which it is attached is stored for example in the platform when it is not used.

A motor can be operably coupled to the pump to lift and lower the pump. The motor is controlled automatically by the control unit to lower the pump when it is needed. If at least a part of the cleaning unit is arranged at the housing of the pump, the control unit can lower the pump when the fluid supply assembly needs to be cleaned.

According to another preferred embodiment of the invention, a crane is used to lift and lower the pump.

A crane can be installed to move the pump to a location where it can be serviced more easily.

According to another preferred embodiment of the invention, the pump is raised and lowered after a specific time or periodically for keeping the fluid connection clean. For example, the pump is moved up and down once a day to keep the fluid connection clean. The pump may also comprise a scraper to clear off any marine growth when lowered or raised in the fluid connection.

According to another preferred embodiment of the invention, the cleaning unit is attached to a moving component which can be lifted and lowered through the fluid connection. The cleaning unit may comprise a nozzle or a plurality of nozzles. The cleaning unit may also comprise a scraper to clear off any marine growth when lowered or raised in the fluid connection.

According to another preferred embodiment of the invention, the fluid supply assembly comprises a filter for filtering the input fluid. Hence, particles and other substances in the water are filtered prior to entering the electrolytic unit. The cleaning unit can also have nozzles directed to the filter to clean the filter.

According to another preferred embodiment of the invention, the filter is installed inside the fluid connection, wherein the filter can be lifted through the fluid connection for cleaning, inspection and maintenance works.

According to another preferred embodiment of the invention, the fluid inlet is arranged at a distance sufficiently removed from the ground level for avoiding the introduction of sand or other substances from the ground level into the fluid inlet. The ground level is the level below the body of water, for example the seabed level. This method reduces the costs of filtering, as less energy and maintenance of the filters is needed.

According to another preferred embodiment of the invention, the fluid inlet is made from an antifouling material, such as copper, to avoid plant growth, in particular marine growth, on the fluid inlet. In particular, any inert material can be used as antifouling material to prevent the formation of plants on the fluid inlet, which obstructs the water flow.

According to another preferred embodiment of the invention, a control unit monitors the pressure of the fluid connection. By monitoring the pressure of the fluid connection, the level of obstruction of the fluid supply assembly can be computed.

According to another preferred embodiment of the invention, a cleaning process driven by the cleaning unit is activated when the pressure needed for a specific flow rate of the input fluid increases above a predetermined value.

Hence, by keeping track of the pressure needed in the fluid connection to have a specific flow rate of the input fluid, the level of obstruction of the fluid connection can be calculated. The pressure can be generated by the pump pumping input fluid through the fluid supply assembly, so the pressure at the pump can be monitored. Hence, by monitoring how much pressure has to be generated by the pump to keep a specific flow rate flowing through the fluid connection of the fluid supply assembly, the level of obstruction can be computed.

According to another preferred embodiment of the invention, the cleaning process is automatically triggered by a control unit. When the pressure needed for a specific flow rate of the input fluid increases above a predetermined value, which can be calculated through experiments, the cleaning process is automatically triggered, which prevents a damage in the fluid supply system and in the electrolytic unit or an overall damage of the offshore wind turbine through a fast reaction to a potential failure of the system.

According to another preferred embodiment of the invention, the cleaning process is triggered manually by warning the workers of the level of obstruction of the fluid supply assembly. This is particularly useful if the cleaning unit has to be manually arranged at the fluid connection, for example because it was lifted and stored in the platform of the wind turbine. Hence, after installing the cleaning unit, the cleaning process can be triggered.

According to another preferred embodiment of the invention, the offshore wind turbine comprises a storage tank configured to provide input fluid to the electrolytic unit.

During the cleaning process by means of the cleaning unit, the fluid supply assembly might not be able to provide the electrolytic unit with input fluid. Therefore, input fluid can be supplied to both the electrolytic unit and to a storage tank to store input fluid for a later use.

Hence, during the cleaning process, the storage tank is able to provide the electrolytic unit with input fluid, thereby avoiding the idle operation of the wind turbine, which results in an increase in the fatigue of the drive train components.

The storage tank can store input fluid coming directly from the fluid inlet if the storage tank is directly connected to the fluid supply assembly. Alternatively, the storage tank can be connected to the output of the desalination unit and store desalinated and filtered water, which can be directly provided to the electrolytic device.

However, in other embodiments, it is also possible to conduct the cleaning process while input fluid is being sucked by the fluid supply assembly. In this case, a storage tank can be used as an extra component being able to provide input fluid to the electrolytic unit in case of an obstruction or of a failure of the fluid supply assembly.

The fluid stored in the storage tank can also be used as the cleaning fluid for the cleaning unit.

According to another preferred embodiment of the invention, the storage tank is arranged on the platform of the offshore wind turbine. This is advantageous, as by arranging the storage tank on the platform, the storage tank will be close to the electrolytic unit, reducing the costs of fluid connections and of pumping between the storage tank and the electrolytic unit.

Additionally, the platform provides for an open space where components such as the storage tank can be arranged. It is easily accessible by workers, hence simplifying maintenance works at the storage tank. For example, the storage tank can be cleaned from marine growth much more easily from the platform.

According to another preferred embodiment of the invention, the storage tank is arranged on or inside the tower. Due to space reasons, it might be necessary to arrange the storage tank at the tower.

According to another preferred embodiment of the invention, the storage tank is arranged on or inside the foundation. The storage tank is arranged close to the water level, hence at the foundation, to ease the pumping of input fluid to the storage tank.

According to another preferred embodiment of the invention, the offshore wind turbine comprises a transition piece between the foundation and the tower, wherein the storage tank is arranged at the transition piece.

The transition piece is disposed on top of the foundation. A particularly preferred type of coupling is a transition piece disposed on top of a monopile, where the transition piece includes the platform disposed on an outer periphery of the transition piece.

According to another preferred embodiment of the invention, the fluid inlet comprises an opening in the foundation or in the tower through which the input fluid is transported to the electrolytic unit.

Hence the foundation has an opening or a hole to collect the water. The location of the opening at the foundation should be chosen in such a way that the opening is always submerged below the water level, considering the tidal movements of the water.

The cleaning unit can be arranged at a pipeline or a channel passing through the foundation or through at least a part of the foundation and at least a part of the tower connecting the fluid inlet with the electrolytic unit.

According to another preferred embodiment of the invention, the fluid supply assembly comprises a flexible hose configured to be submerged under the water level and a hose reel configured to be rotated for winding the hose thereon.

The hose of the fluid supply assembly is flexible to be able to wind the hose on the hose reel. Hence, by rotating the hose reel, the flexible hose can be lowered from a raised position to a lowered position or vice versa. The fluid supply assembly can comprise means to rotate the hose reel for winding the hose thereon and thereby changing from a lowered position of the hose to a raised position of the hose.

The raised position can be a position in which the hose is completely rolled over the water level and the lowered position is a position in which the fluid inlet of the hose is submerged under the water level.

In the lowered position, the hose can be hanging from the hose reel without any supporting or guiding means, i.e. it can be hanging free.

The hose can be for example a hollow tube which can be reinforced for a better durability.

The cleaning unit can be arranged inside the flexible hose connecting the fluid inlet with the electrolytic unit.

Yet another aspect of embodiments of the invention relate to a method of cleaning a fluid connection of an offshore wind turbine comprising the steps of pumping a cleaning fluid to the nozzle of the cleaning unit, and spraying the cleaning fluid through the nozzle of the cleaning unit to clean the build-up formed along an area proximate to the nozzle.

BRIEF DESCRIPTION

Some of the embodiments will be described in detail, with reference to the following figures, wherein like designations denote like members, wherein.

DETAILED DESCRIPTION

Figure 1:
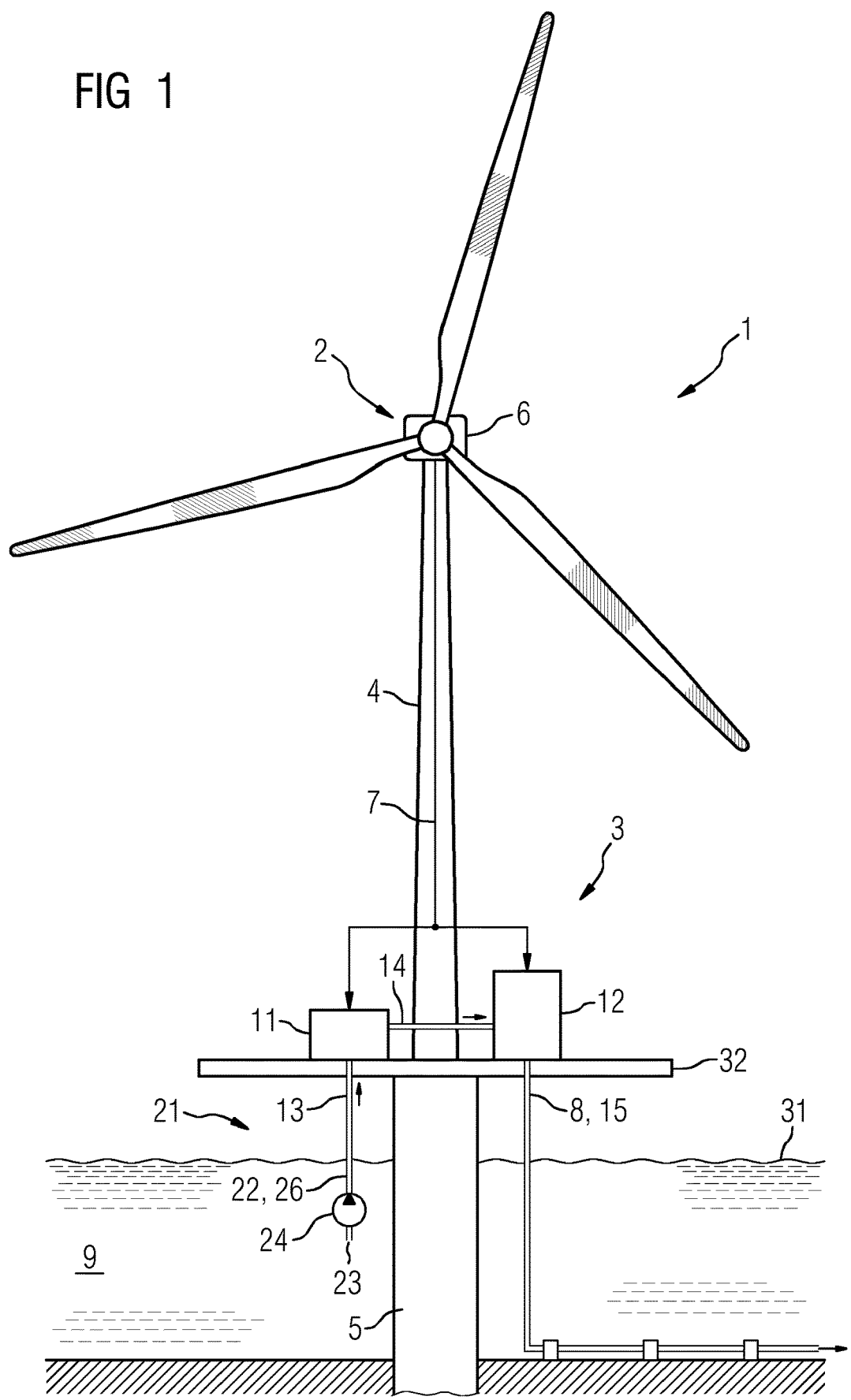
FIG. 1 shows a schematic view of an offshore wind turbine comprising a hose hanging from the electrolytic unit for the fluid supply.

FIG. 1 shows a schematic view of an offshore wind turbine 1 comprising a hose 26 hanging from the electrolytic unit 3 for the fluid supply.

The offshore wind turbine 1 comprises a tower 4 on top of which a nacelle 6 is rotatably mounted. The offshore wind turbine 1 further comprises a hub which is connected to the nacelle 6. A plurality of blades is mounted on the hub. The hub is connected to a generator 2 and is rotatably mounted about a rotor axis by means of a main bearing. The offshore wind turbine 1 further comprises a platform 32 on which the electrolytic unit 3 is arranged above the water level 31. The offshore wind turbine 1 further comprises a foundation 5 on which the tower 4 is mounted. The foundation 5 is a monopile mounted to the floor of the body of water.

The power produced by the generator 2 is completely transferred to the electrolytic unit 3, but it would be also possible to connect the offshore wind turbine 1 to an electricity grid and transfer a part of the power produced by the generator 2 to the electricity grid. The electrolytic unit 3 comprises a desalination unit 11 and an electrolytic device 12, as well as a fluid connection between the desalination unit 11 and the electrolytic device 12 through which desalinated water 14 is transported. The electrolytic device 12 and the desalination unit 11 are both powered by the generator 2, which is connected to both devices by means of an electric connection 7.

The input fluid 9 for the electrolytic unit 3 is saltwater 13 taken of the sea of the offshore wind turbine 1 by means of a pump 24. Hence, the fluid supply assembly 21 supplies saltwater 13 to the electrolytic unit 3 by means of a hanging hose 26. The hose 26 hangs from the desalination unit 11 to the water body at the outer part of the fundament 5. The saltwater 13 enters the fluid supply assembly 21 through a fluid inlet 23 and is transported through the hose 26, which creates a fluid connection 22 between the fluid inlet 23 and the desalination unit 11 forming part of the electrolytic unit 3. The fluid inlet 23 and the pump 24 are submerged below the water level 31 to suction the saltwater 13.

The desalinated water 14 is the input fluid 9 of the electrolytic device 12. The electrolytic device has a hydrogen output 15 through which the hydrogen 8 generated is extracted. This hydrogen output 15 is connected to a hydrogen pipeline to transport the hydrogen 8 onshore. Alternatively, the hydrogen 8 could be filled in containers and transported onshore.

Figure 2:
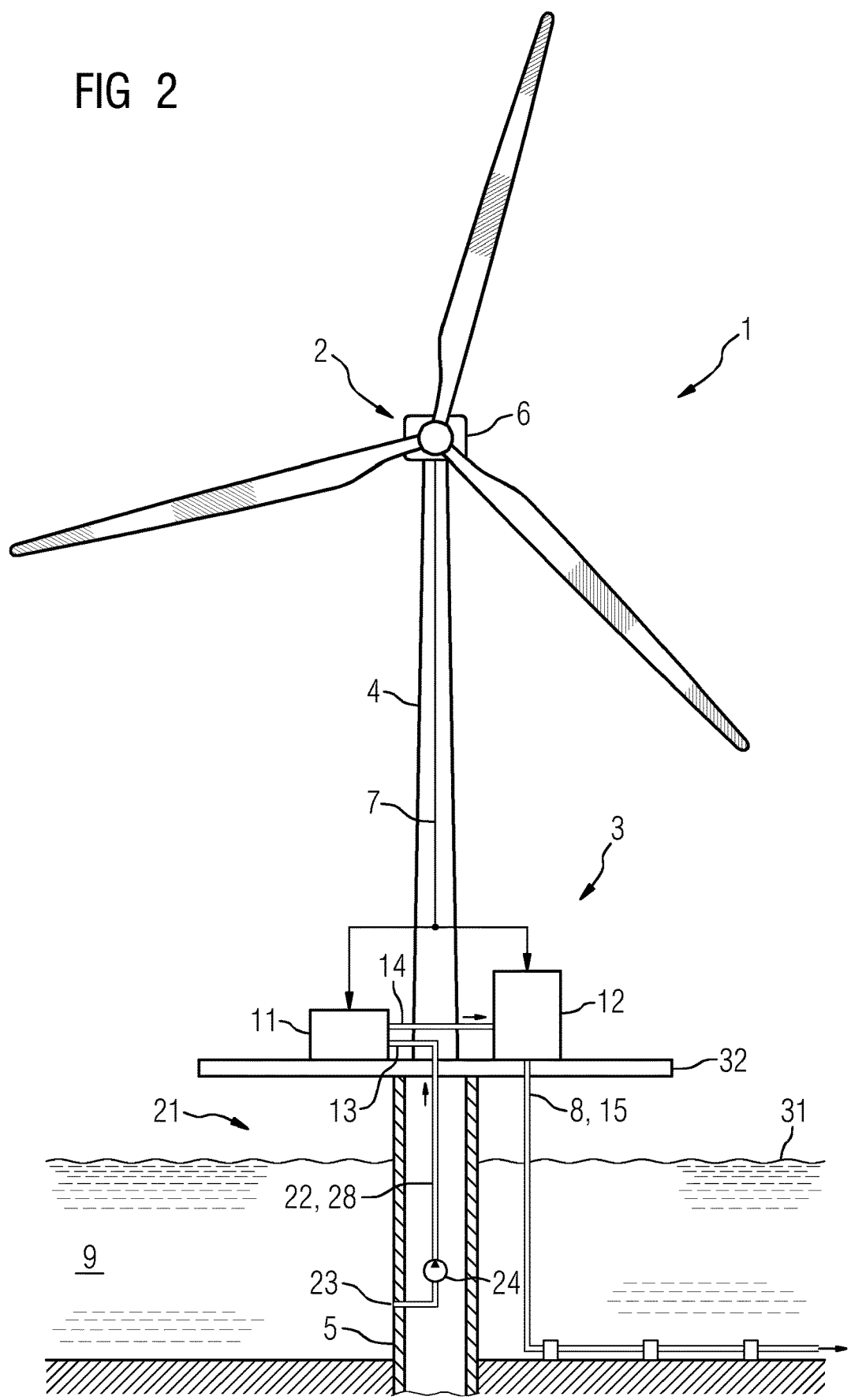
FIG. 2 shows a schematic view of an offshore wind turbine comprising a fluid connection expanding through the inner part of the foundation.

FIG. 2 shows a schematic view of an offshore wind turbine 1 comprising a fluid connection 22 expanding through the inner part of the foundation 5.

In this embodiment, the offshore wind turbine 1 comprises a foundation 5 on which the tower 4 is mounted. The foundation 5 is a monopile mounted to the floor of the body of water.

An opening at the foundation 5 allows for the suctioning of the saltwater 13 by means of the pump 24 of the fluid supply assembly 21. The fluid connection 22 through the foundation 5 can be formed as a channel or as a pipeline 28. The fluid connection 22 extends in the longitudinal direction parallel to the axis of the foundation 5 and the axis of the tower 4 towards the electrolytic unit platform 32 of the offshore wind turbine 1. This fluid connection 22 extends through the inner part of the foundation 5.

Figure 3:
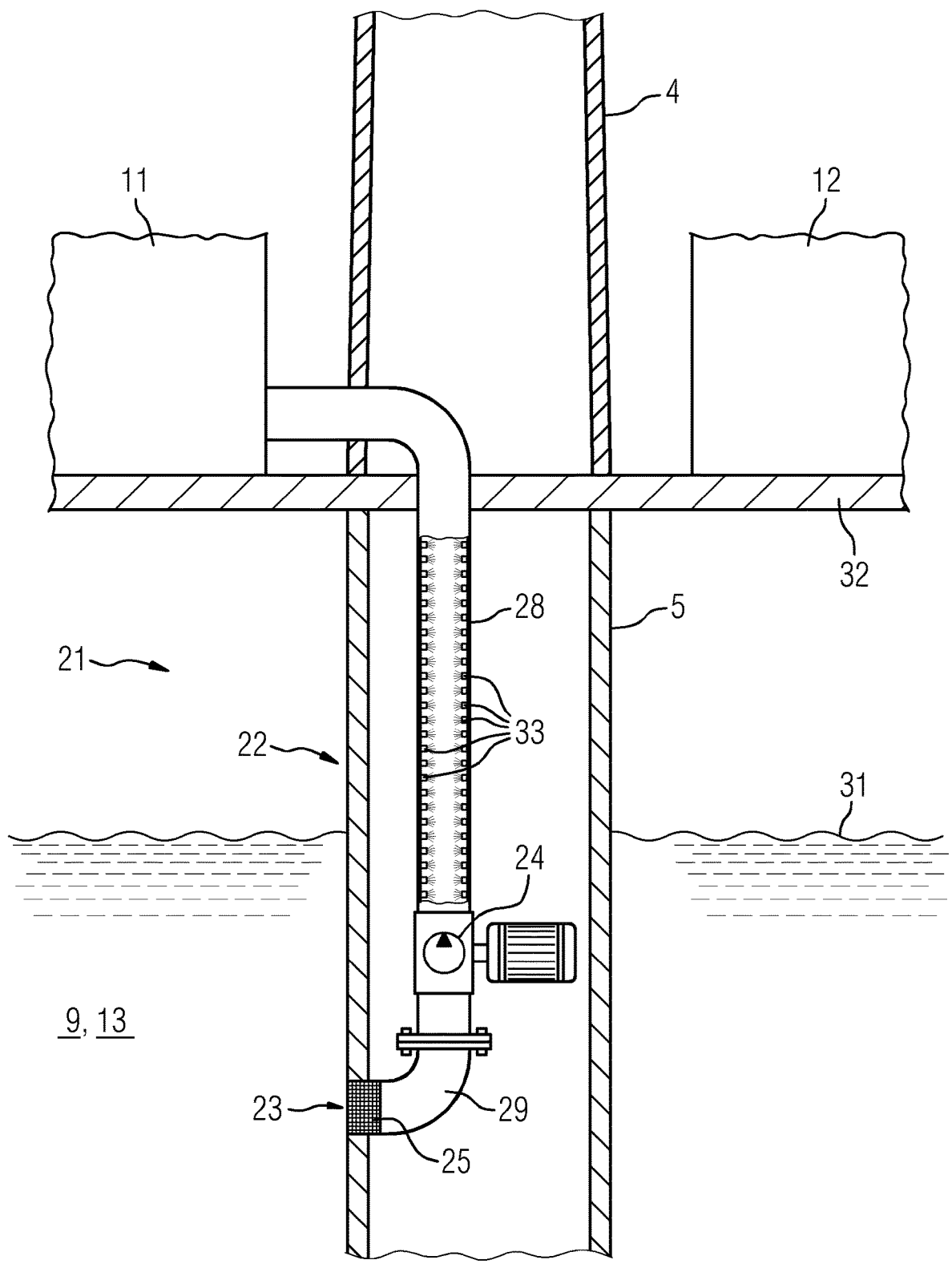
FIG. 3 shows a fluid supply assembly comprising a filter, a fluid inlet, a pump, an angled fitting, a pipeline and a cleaning unit comprising a plurality of nozzles.

FIG. 3 shows a fluid supply assembly 21 comprising a filter 25, a fluid inlet 23, a pump 24, an angled fitting 29, a pipeline 28 and a cleaning unit comprising a plurality of nozzles 33.

Saltwater 13 passes through the filter 25 before entering the fluid inlet 23, so sand, plants and other unwanted substances are kept outside the fluid supply assembly 21. The angled fitting 29 turns the flow of saltwater 13 to the upright direction so as to be directed towards the electrolytic unit 3 arranged on the electrolytic unit platform 32. To transport the saltwater 13, a pipeline 28 is used, which extends inside the foundation 5 to the electrolytic unit platform 32. The pipeline 28 and the angled fitting 29 are sealed by a bolted flange connection to avoid a leakage in the transition between both parts.

A pump 24 driven by a motor is used to overcome the height difference between the desalination unit 11 and the water level 31.

Along the inner wall of the pipeline 28 a plurality of nozzles 33 are arranged and distributed to spray cleaning fluid inside the pipeline 28 and clean the pipeline 28 from build-up formed over time. The nozzles 33 can be connected to a separate pump 24 to pump cleaning fluid to the nozzles 33. Fluid from the body of water can be pumped to the nozzles 33. Alternatively, fluid stored in a storage tank 34, such as saltwater 13 or desalinated water 14 can be pumped to the nozzles 33 as the cleaning fluid.

Figure 4:
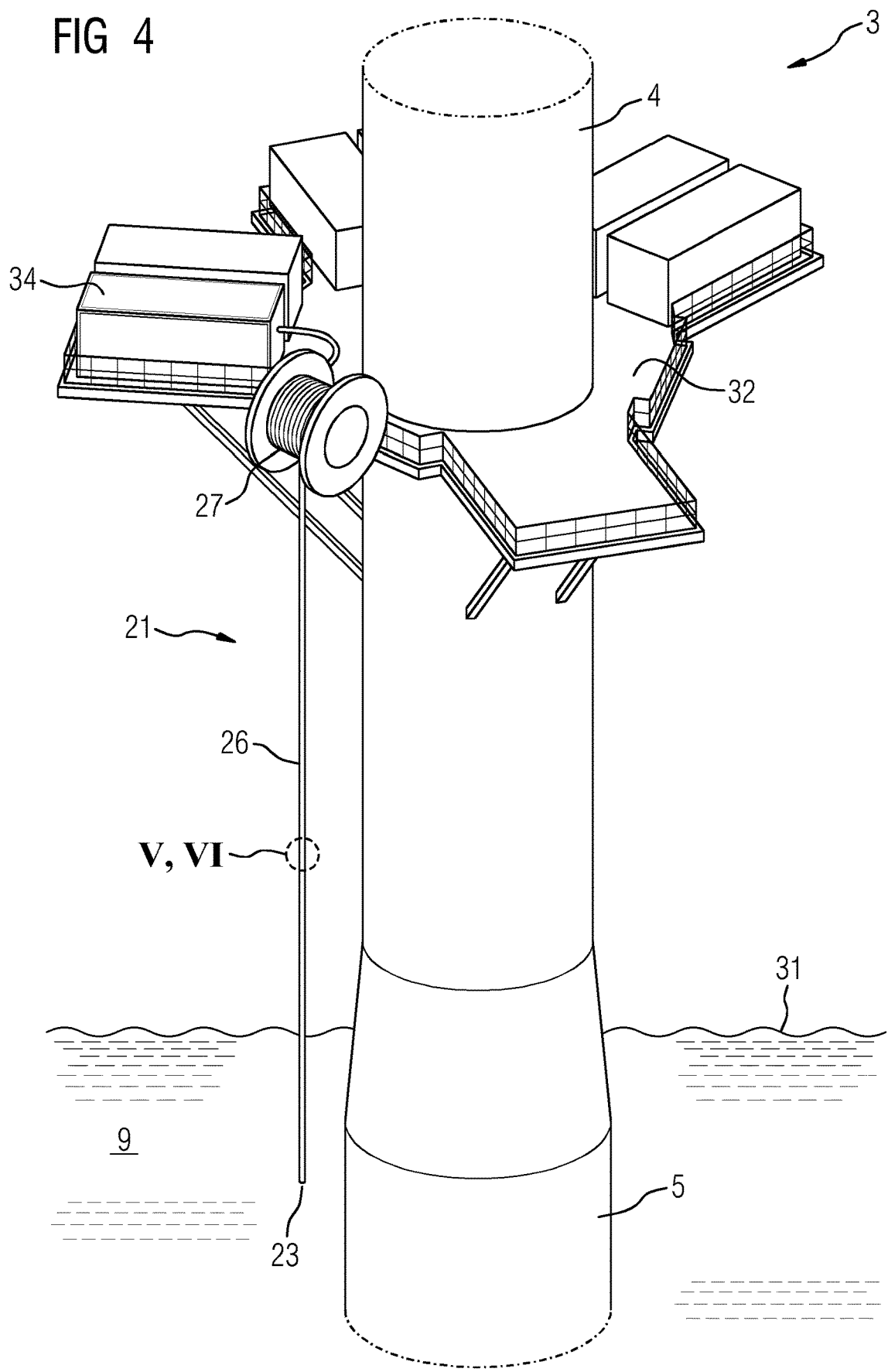
FIG. 4 shows an offshore wind turbine comprising a flexible hose hanging from a hose reel.

FIG. 4 shows an offshore wind turbine 1 comprising a flexible hose 26 hanging from a hose reel 27. By means of the hose reel 27, the hose 26 can be raised above the water level 31 and lowered below the water level 31. When input fluid 9 is suctioned from the body of water the offshore wind turbine 1 is erected on, the hose 26 is lowered below the water level 31.

The hose 26 as part of the fluid supply assembly 21 is connected to the electrolytic unit 3 to provide the electrolytic unit 3 with input fluid 9.

Additionally, in this embodiment of the invention, the hose 26 is connected to a storage tank 34. The storage tank 34 is configured to provide input fluid 9 to the electrolytic unit 3 as well. This is particularly useful during the cleaning process of the hose 26, as the fluid supply assembly 21 is not able to provide the electrolytic unit 3 with input fluid 9, so the input fluid 9 necessary for the operation of the electrolytic unit 3 can be provided by the storage tank 34, thereby avoiding the idle operation of the offshore wind turbine 1, which results in an increase in the fatigue of the drive train components.

The storage tank 34 can also be used to provide cleaning fluid to the cleaning unit installed inside the hose 26 or configured to be arranged within the hose 26.

Figure 5:
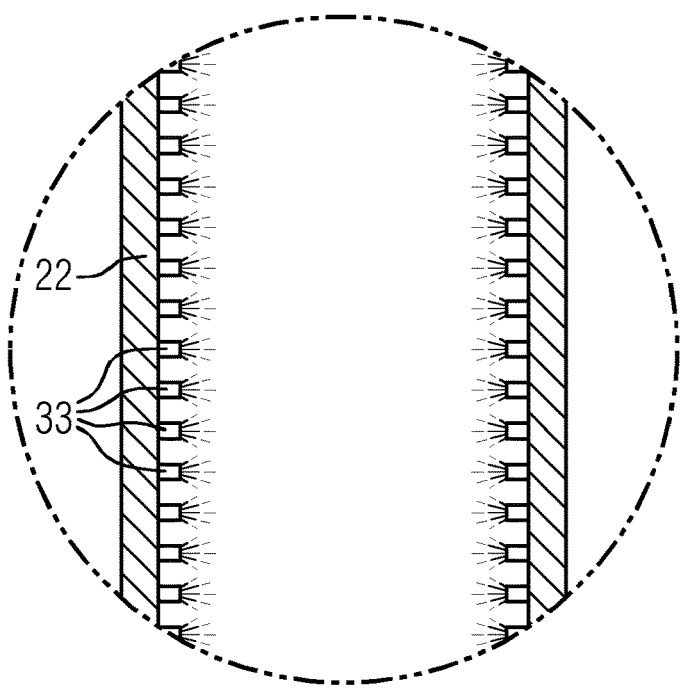
FIG. 5 shows a cleaning unit arranged at the inner wall of the fluid connection, in this case in the inner wall of the hose.

FIG. 5 shows a cleaning unit arranged at the inner wall of the fluid connection 22, in this case in the inner wall of the hose 26. This could be the view V shown in FIG. 4.

Along the inner wall of the hose 26 a plurality of nozzles 33 are arranged and distributed to spray cleaning fluid inside the hose 26 and clean the hose 26 from build-up formed over time. The nozzles 33 can be connected to a separate pump 24 to pump cleaning fluid to the nozzles 33. Fluid from the body of water can be pumped to the nozzles 33. Alternatively, fluid stored in a storage tank 34, such as saltwater 13 or desalinated water 14 can be pumped to the nozzles 33 as the cleaning fluid.

Figure 6:
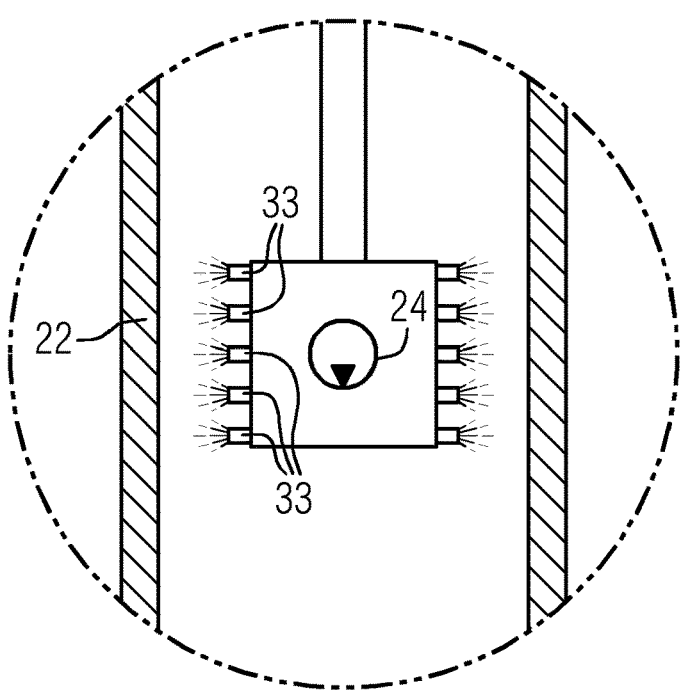
FIG. 6 shows a cleaning unit arranged at the housing of a pump which can be lifted and lowered through the fluid connection, in this case the hose.

FIG. 6 shows a cleaning unit arranged at the housing of a pump 24 which can be lifted and lowered through the fluid connection 22, in this case the hose 26. This could be the view VI shown in FIG. 4.

By having a plurality of nozzles 33 arranged at a pump 24 which can be lifted and lowered through the fluid connection 22, the area cleaned by the cleaning unit is increased, as the pump 24 can be lowered from the upper part of the fluid connection 22 down to the lowest part of the fluid connection 22 and clean the fluid connection 22 through the path where it passes. A crane or a motor can be used to lift and lower the pump 24.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCE LIST

1 Offshore wind turbine
2 Generator
3 Electrolytic unit
4 Tower
5 Foundation
6 Nacelle
7 Electrical connection
8 Hydrogen
9 Input fluid
11 Desalination unit
12 Electrolytic device
13 Saltwater
14 Desalinated water
15 Hydrogen output
21 Fluid supply assembly
22 Fluid connection
23 Fluid inlet
24 Pump
25 Filter
26 Hose
27 Hose reel
28 Pipeline
29 Angled fitting
31 Water level
32 Platform
33 Nozzle
34 Storage tank

The invention claimed is:

1. An offshore wind turbine erected in a body of water comprising:
a generator;
a foundation;
a nacelle;
a tower having a first end mounted to the foundation and a second end supporting the nacelle;
an electrolytic unit arranged above a water level and electrically powered by the generator to produce hydrogen from an input fluid; and
a fluid supply assembly for supplying the input fluid from a fluid inlet arranged below the water level to the electrolytic unit by means of a fluid connection;
wherein the fluid supply assembly comprises a cleaning unit configured to clean a build-up formed along an area extending through an inner part of at least a part of the fluid connection or formed at the fluid inlet, further wherein the cleaning unit comprises a nozzle; and
wherein the fluid supply assembly further comprises a pump for pumping the input fluid to the electrolytic unit, further wherein at least a part of the cleaning unit is arranged at a housing of the pump.

2. The offshore wind turbine according to claim 1, wherein a cleaning fluid used by the cleaning unit for cleaning the build-up comprises desalinated water from a desalination unit of the electrolytic unit.

3. The offshore wind turbine according to claim 1, wherein at least a part of the cleaning unit is arranged at an inner wall of the fluid connection.

4. The offshore wind turbine according to claim 1, wherein the pump is configured to be lifted and lowered through the fluid connection.

5. The offshore wind turbine according to claim 4, wherein a crane is used to lift and lower the pump.

6. The offshore wind turbine according to claim 1, wherein a cleaning process driven by the cleaning unit is activated when a pressure needed for a specific flow rate of the input fluid increases above a predetermined value.

7. The offshore wind turbine according to claim 6, wherein the cleaning process is automatically triggered by a control unit.

8. The offshore wind turbine according to claim 1, wherein the offshore wind turbine comprises a storage tank configured to provide input fluid to the electrolytic unit.

9. The offshore wind turbine according to claim 8, wherein the offshore wind turbine further comprises a platform supporting at least a part of the electrolytic unit above the water level, further wherein the storage tank is arranged at the platform.

10. The offshore wind turbine according to claim 8, wherein the storage tank is arranged on or inside the tower.

11. The offshore wind turbine according to claim 8, wherein the storage tank is arranged on or inside the foundation.

12. The offshore wind turbine according to claim 1, wherein the fluid inlet comprises an opening in the foundation or in the tower through which the input fluid is transported to the electrolytic unit.

13. The offshore wind turbine according to claim 1, wherein the fluid supply assembly comprises a flexible hose configured to be submerged under the water level and a hose reel configured to be rotated for winding the hose thereon.

14. A method comprising:
cleaning a fluid connection of an offshore wind turbine comprising: a generator, a foundation, a nacelle, a tower having a first end mounted to the foundation and a second end supporting the nacelle, an electrolytic unit arranged above a water level and electrically powered by the generator to produce hydrogen from an input fluid, and a fluid supply assembly for supplying the input fluid from a fluid inlet arranged below the water level to the electrolytic unit by means of a fluid connection, wherein the fluid supply assembly comprises a cleaning unit configured to clean a build-up formed along an area extending through an inner part of at least a part of the fluid connection or formed at the fluid inlet, further wherein the cleaning unit comprises a nozzle, and wherein the fluid supply assembly further comprises a pump for pumping the input fluid to the electrolytic unit, further wherein at least a part of the cleaning unit is arranged at a housing of the pump;
wherein the cleaning includes:
pumping a cleaning fluid to the nozzle of the cleaning unit; and
spraying the cleaning fluid through the nozzle of the cleaning unit to clean the build-up formed along an area proximate to the nozzle.

* * * * *